April 19, 1932.  A. E. HANSEN  1,854,837
VALVE
Filed June 1, 1931
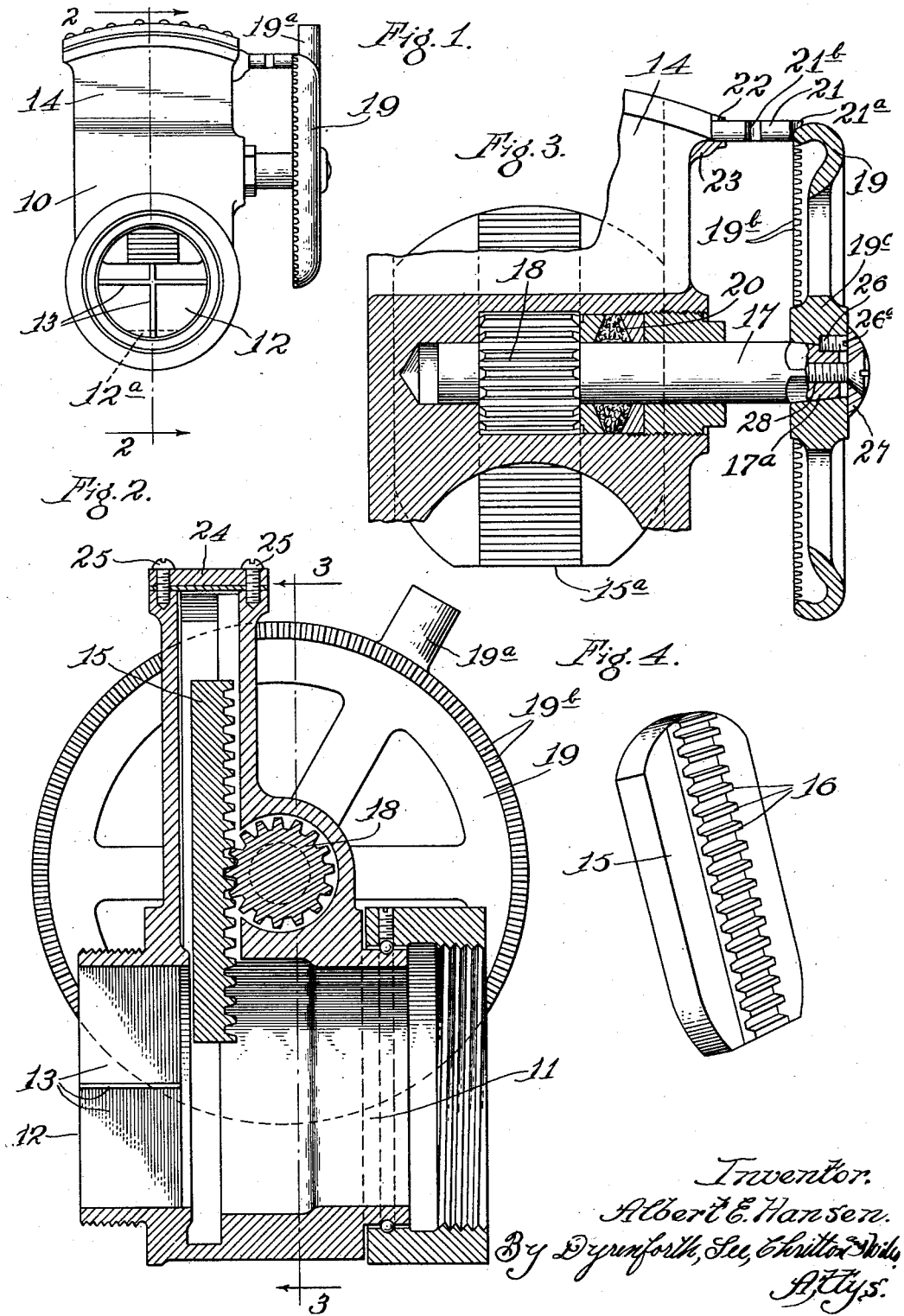
Inventor.
Albert E. Hansen.
By Dyrenforth, Lee, Chritton & Wiles
Attys.

Patented Apr. 19, 1932

1,854,837

UNITED STATES PATENT OFFICE

ALBERT E. HANSEN, OF ELKHART, INDIANA, ASSIGNOR TO ELKHART BRASS MANUFACTURING COMPANY, OF ELKHART, INDIANA, A CORPORATION OF INDIANA

VALVE

Application filed June 1, 1931. Serial No. 541,502.

This invention relates to improvements in controlling valves, and more especially such valves adapted for use on standpipes for fire protection.

One of the features of my invention is the provision of such a valve that can be set with any desired opening, within its range, and locked in position. It has been found, in connection with fire protection standpipes in modern buildings of great height, that some of the lower outlets will build up an excessively high pressure in the service hose unless such outlets are equipped with restricted openings. In speaking of the pressure built up in a service hose, it is to be understood that such hose, for example, on the various floors of a building are customarily provided with nozzles without valves or shut-offs. Consequently, the pressure built up in such a hose with the water running will be a function of the head or pressure of water in the standpipe and the size of the opening delivering into the service hose. My improved valve can be set with any desired opening, within its range, to adapt it for use on any floor of a building; and when so set, it can be locked in position so that its adjustment cannot easily be changed. Means are also provided for visibly indicating the setting of the valve, thus facilitating inspection.

Another feature of my invention is the provision of simplified, rugged construction of the operating parts of the valve, insuring long and efficient service.

Another feature of my invention is the provision of means preventing the valve from being entirely closed so as to assure some water supply being available, regardless of the position in which the valve is set.

Another feature of the invention is the provision of breakable locking means so that in the event the valve should be set for a pressure too low to give effective protection, the locking means can be easily and quickly broken by anyone in charge of fire-fighting apparatus and the valve opened to any desired degree.

Another feature of my invention is the provision of means for adjusting the valve or locking the same, said locking means requiring special tools for release, assuming that the breakable locking means above mentioned is not broken.

Other features and advantages of my invention will appear more fully as I proceed with my specification.

In that form of device embodying the features of my invention shown in the accompanying drawings—

Figure 1 is a view in front elevation; Fig. 2 is a view taken as indicated by the line 2 of Fig. 1; Fig. 3 is a view taken as indicated by the line 3 of Fig. 2; and Fig. 4 is a view in perspective of the gate.

As shown in the drawings, 10 indicates a casing with an inlet opening 11 and a discharge opening 12. Numeral 13 indicates a pair of cross plates or vanes in the discharge opening to break up the stream. This element is of well-known construction and forms no part of the present invention.

Numeral 14 indicates a vertical extension on the casing 10 to accommodate the vertically slidable gate 15. The gate 15 is provided on one face with a series of teeth 16 made integral with the gate and forming a rack bar.

Numeral 17 indicates a transversely arranged rotatable shaft carrying a pinion or gear 18 meshing with the rack bar 16. The shaft 17 may be turned by the operating handle 19, and 20 indicates suitable packing of the usual kind where the shaft 17 enters the casing 10. The handle 19 is provided with a radially extending lug $19^a$ adapted to be engaged by a hose wrench for turning the wheel 19.

The lower end of the gate 15, instead of being rounded to conform to the circular openings 11 and 12, is cut off straight, as indicated by $15^a$. Accordingly, when the gate 15 is completely lowered, passage through the valve is not entirely cut off, but there remains a small minimum opening $12^a$.

Raising the gate to pre-determined positions will give corresponding degrees of opening. The following means are provided for locking the valve in any desired position. The inner edge of the handle 19 is provided with teeth $19^b$. Numeral 21 indicates a breakable pin, one end of which is adapted to be inserted in a socket 22 in the boss or lug 23 carried at the upper part of the extension 14. The outer end of the pin 21 is provided with a blunt knife edge 21ª adapted to be engaged between two of the teeth 19ᵇ when the handle 19 is in the desired position. A portion of the pin 21 is thinned or weakened, as indicated by 21ᵇ to permit said pin to be broken in the event it is desired to quickly change the setting of the valve. The pin is designed to prevent ordinary manipulation of the valve to change it from the position in which set. Being breakable, however, it is possible by exerting sufficient force to break the pin. This will permit an authorized operator of fire-fighting apparatus to quickly change the setting if it becomes necessary in an emergency. The necessary force can be applied by application of a hose wrench to the lug 19ª on the handle 19.

The top of the extension 14 on the casing 10 is closed by a cap 24 fastened on by the screws 25. When the cap is removed, the gate 15 may be lifted entirely out.

In ordinary practice, the setting of the valve may be changed without breaking the pin 21. This is accomplished in the following manner. The outer end of the shaft 17 is squared and tapered, as indicated by 17ª, and adapted to be inserted in a corresponding socket in the hub 19ᶜ of the handle or wheel 19. The wheel 19 is held on the end of the shaft 17 by means of a locking screw 26 threaded into a hole partly in the hub of the wheel and partly in the shaft 17. The screw 26 is provided with a small square socket 26ª adapted to be engaged only by a special wrench having a squared end adapted to fit in such socket. It will be seen, therefore, that the wheel 19 cannot be removed without a special wrench adapted to fit in the socket 26ª in the locking screw 26. For additional safety, the screw 26 may be covered by a washer 27 held in place by a screw 28 threaded into the end of the shaft 17. To set the valve without breaking the pin 21, the hand wheel is first removed and the pin taken out. The hand wheel is then put on the shaft and the same turned to set the valve in the desired position. The hand wheel is then again removed, the pin 21 inserted laterally, the hand wheel then put on and fastened in position with the screw 26 and screw 28.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A valve of the character described, including; a casing with an inlet and a discharge opening and provided with an extension, said extension being provided with a socket to receive one end of a locking pin; a slidable gate in the casing between the inlet and discharge openings, one end of said gate projecting into said extension; a rack bar on said gate; a transversely arranged shaft extending into said casing and provided with a gear meshing with the rack bar on the gate; a wheel handle carried by said shaft outside of the casing, said wheel handle being provided with teeth; and a breakable locking pin adapted to have one end inserted in the socket on the extension and the other end between two teeth of the wheel handle to lock the wheel handle in a pre-determined position.

2. A valve as claimed in claim 1, in which the wheel handle is removably mounted on the end of the shaft and adapted to be locked thereon by locking mechanism including a screw with a socket adapted to be engaged only by a special wrench.

3. A valve as claimed in claim 1, in which the gate has a portion cut off of its lower end to prevent the valve from being completely closed.

4. A valve as claimed in claim 1, in which the wheel handle is provided with a radial lug adapted to be engaged by a hose wrench.

In witness whereof, I have hereunto set my hand, this 27th day of May, 1931.

ALBERT E. HANSEN.